Aug. 27, 1957 R. D. PEARSON 2,804,320
HOSE COUPLING WITH RIGID THREADS MOLDED THEREIN
Filed Jan. 27, 1954
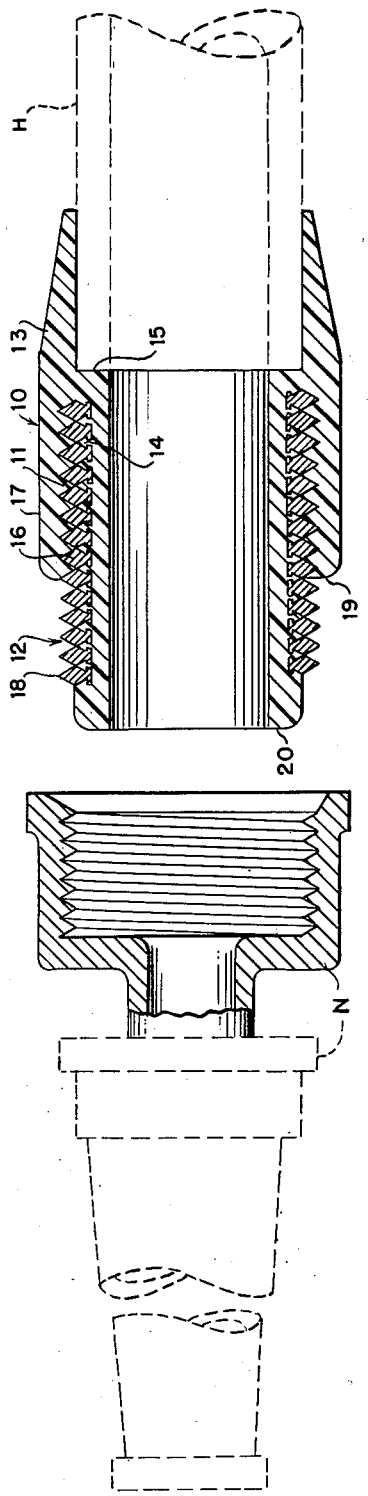
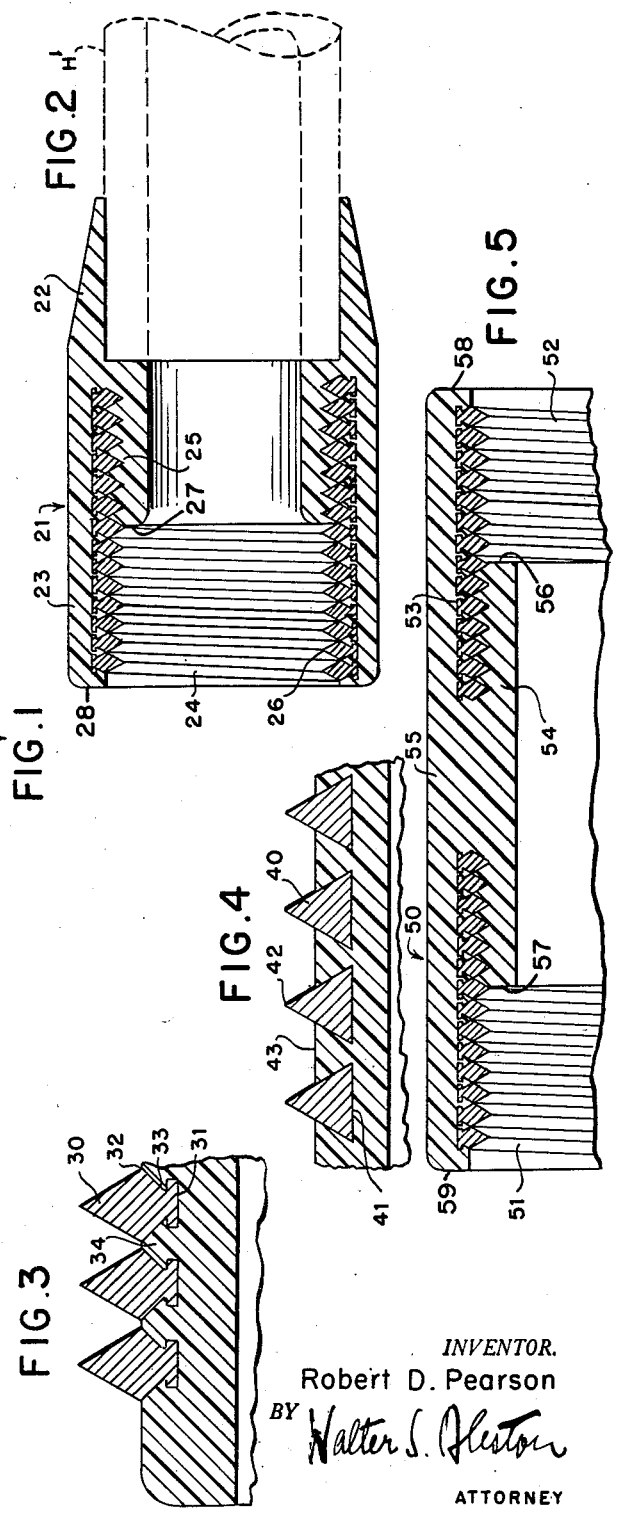
INVENTOR.
Robert D. Pearson
BY Walter S. Heston
ATTORNEY United States Patent Office 2,804,320
Patented Aug. 27, 1957

2,804,320

HOSE COUPLING WITH RIGID THREADS MOLDED THEREIN

Robert D. Pearson, Brookfield, Conn., assignor to Heli-Coil Corporation, Danbury, Conn., a corporation of Delaware Application January 27, 1954, Serial No. 406,445

4 Claims. (Cl. 285—392)

The invention relates to a hose coupling and more particularly to a coupling with a metal thread moulded into a non-metallic material such as rubber or a synthetic composition.

The invention aims to provide a hose coupling in which a wire coil is moulded into the material of a coupling piece so that the wire coil can form a screw thread for the connection with a nozzle or other coupling member.

The invention further aims to provide a hose coupling of the mentioned type wherein one portion of the wire coil is entirely embedded in the material of the body of the coupling piece whereas another portion which forms the connecting thread is embedded with only a portion of the cross-section of the coil wire.

Further objects and details of the invention will be apparent from the description given hereinafter and the acompanying drawing illustrating an embodiment thereof by way of example. In the drawing:

Fig. 1 is a longitudinal section of a coupling piece according to the invention with external screw thread, Fig. 2 is a longitudinal section of a coupling piece with internal screw thread, Fig. 3 is an enlarged sectional portion of the coupling piece of Fig. 1, Fig. 4 is a section similar to Fig. 3 with a modified wire coil, and Fig. 5 is a longitudinal section of another type of a coupling member.

Referring now to the drawing, Fig. 1 shows a spigot or exteriorly screw threaded piece of a coupling in general denoted by 10. It consists of the moulded body 11 of rubber or a mouldable synthetic material and the wire coil 12. The one end 13 forms a sleeve to receive therein a hose H which may be vulcanized or otherwise connected to the piece 10. Another tubular portion 14 of piece 10 is of an inner diameter similar to that of the hose H which abuts against the shoulder 15 between the portions 13 and 14. In portion 14 the wire coil 12 is embedded with its inner part, i. e. with the foot of the cross-section of the coil wire. A considerable length 16 of the coil 12 is covered by the outer body portion 17 which is co-axial with portion 14 and extends in continuation of the sleeve 13 so that the coil length 16 is entirely embedded by moulding in the body 10 and very firmly secured thereto. The remainder portion 18 of the coil projects outwardly from the body portion 14 and forms an exterior screw thread for the connection of an interiorly threaded piece as for instance the nozzle N indicated in Fig. 1 in dash and dot line. If the interiorly threaded nozzle portion is longer than the body portion of the coupling member from which the coil portion 18 projects, then the edge 19 of the body portion 17 will abut and form a gasket so as to seal the connection tightly. If the nozzle portion is shorter, the edge 20 of the body portion will form a gasket, and if the nozzle portion is approximately equal to the body portion between the edges 19 and 20 both these edges will abut so that there is a double seal.

Fig. 2 shows a coupling member or socket 21 which is provided with an inner thread and formed according to the same principle as the exteriorly threaded piece of Fig. 1. The socket 21 comprises an outer sleeve-forming portion 22 from which the main tubular body portion 23 extends. The coil 24 is embedded throughout its length in the inside of portion 23 and approximately half of the coil length is covered on the inside by tubular body portion 25 the inner diameter of which equals that of the hose H' to which the socket 21 is attached in Fig. 2. The portion 26 of the coil which is not covered by the body portion 25 forms the desired interior screw thread. Similarly to the edges 19 and 20 in Fig. 1, the edge 27 of the portion 25 which projects axially inwards with respect to the mentioned thread, and the edge 28 of the portion 23 which projects outwards with respect to that thread, form gaskets or are capable of functioning as such if a tubular member such as a spigot, with an external thread and which, if so desired may be of the form of Fig. 1, is screwed into the thread formed by the coil 26.

Although the invention is not limited to any particular wire cross-section or cross-sections of the coils such cross-sections are preferred which have a dove-tailed foot portion or a base portion which is wider than the immediately adjacent portion. Thus, e. g. the cross-section shown at an enlarged scale in Fig. 3 is very useful if a conventional V thread is desired. This form can be defined as an arrow point 30 having a base 31 which is a little narrower than the widest part 32, and being laterally recessed at 33 between the base and the part 32. If then the convolutions of a coil are wound closely adjacent one another the moulded material can enter between the bases as shown at 34 and securely anchor the coils in the body of the coupling member. Depending on whether the coil is destined to form an external or internal screw thread, the wire will be wound with the base on the inside or on the outside of the coil. Another wire cross-section which can be securely anchored in a moulded body is e. g. the triangle 40 shown in Fig. 4. One of the sides of the triangle forms the embedded base 41, and the opposite point 42 projects from the body material. Thus the embedded portion constitutes a dovetail-like foot whereas the projecting portions of the wire coil form a screw thread fitting a V groove. However, this thread differs from the thread formed by the wire of Fig. 3 by the rather large lands 43 which are required between adjacent wire cross-sections whereas the cross-sections according to Fig. 3 may be located quite closely to one another.

Whereas in Figs. 1 and 2 coupling members in the form of a spigot and of a socket, respectively, have been shown, it is of course also possible to apply the invention to other forms of hose coupling members, as e. g. to a coupling member for connecting two spigots or two sockets. A coupling member e. g. for connecting two spigots is shown in Fig. 5, where two coils 51 and 52 are moulded in a body 50. The body 50 comprises an outer portion 53 in which the outer portions of the total lengths of the coils 51 and 52 are embedded and an inner portion 54 covering only about half the length of the coils. The portions 53 and 54 are connected by the central portion 55 between the two coils. Also in this embodiment, gasket-forming edges exist at the ends 56 and 57 of the inner portion 54 and at the ends 58 and 59 of the outer portion 55.

It will be apparent that many modifications and alterations of the structure hereinbefore described and illustrated may be made without departure from the essence and spirit of my invention which for that reason shall not be limited but by the scope of the appended claims.

I claim:

1. A hose coupling member comprising a body of rubber-like mouldable material and a coil of a wire having a cross-section consisting of a substantially dovetail-like foot forming part and a triangular screw-thread forming part adjoining said foot forming part, said body comprising two co-axial, substantially tubular, portions of different length integrally connected to each other at one of their ends, said coil extending from said connected ends substantially to the opposite free end of said longer body portion and being moulded, throughout its whole length with said foot forming part of its wire cross-section into said longer body portion on the side adjacent said shorter body portion, and being moulded with the thread-forming part of its wire cross-section into said shorter body portion from said connected ends to the opposite end of said shorter body portion, the coil portion between the free end of said longer body portion and the adjacent end of said shorter body portion being exposed so as to constitute a screw thread for engagement of a mating threaded coupling member.

2. A hose coupling member as claimed in claim 1, said body furthermore including a sleeve extending from said connected ends in the direction opposite said co-axial body portions and having an inner diameter larger than the inner one of said co-axial body portions.

3. A hose coupling member as claimed in claim 1, said longer portion of said body extending with its free end a short distance beyond the adjacent end of said coil, whereby said extension is adapted to serve as a gasket, and the end edge of said shorter portion opposite said connected ends extending from said coil axially inward so as to act as the face of another gasket when a mating threaded member engages said end edge.

4. A hose coupling member comprising a substantially tubular body of rubber-like mouldable material and two coils of wire, the wire of each coil having a cross-section consisting of a foot forming part and a screw thread forming part, said body comprising a central portion and, extending therefrom on each side thereof, a portion containing one of said coils, each coil-containing portion comprising two co-axial, substantially tubular portions of different length with the associated coil therebetween, said tubular portions being integrally connected with one of their ends to each other and to said central portion, said coil extending from said connected ends substantially to the opposite free end of said longer tubular portion and being moulded, throughout its whole length, with said foot forming part of its wire cross-section into said longer tubular portion on the side adjacent said shorter tubular portion, and being moulded with the thread forming part of its wire cross-section into said shorter tubular portion from said connected ends to the opposite end of said shorter body portion.

References Cited in the file of this patent

UNITED STATES PATENTS

| | | |
|---|---|---|
| 1,378,015 | Erickson | May 17, 1921 |
| 1,985,494 | Gish | Dec. 25, 1934 |
| 2,110,458 | Applegate | Mar. 8, 1938 |
| 2,296,198 | Boynton | Sept. 15, 1942 |
| 2,311,329 | Caminez | Feb. 16, 1943 |
| 2,480,966 | Richardson et al. | Sept. 6, 1949 |

FOREIGN PATENTS

| | | |
|---|---|---|
| 66,805 | Austria | Apr. 1, 1914 |
| 980,989 | France | Jan. 10, 1951 |